UNITED STATES PATENT OFFICE.

PIERRE A. F. BOBŒUF, OF PARIS, FRANCE.

IMPROVED PREPARATION TO SERVE AS HEMOSTATIC AND ANTISEPTIC AGENTS.

Specification forming part of Letters Patent No. 38,940, dated June 23, 1863.

*To all whom it may concern:*

Be it known that I, PIERRE ALEXIS FRANCISSE BOBŒUF, of Paris, in the French Empire, have invented certain new and useful Improvements in the Preparation and Application of Certain new Hemostatic and Antiseptic Agents; and I hereby declare that the following is a full, clear, and exact description of the same.

My invention relates to the manufacture and application as hemostatic agents of alkaline "phenates" and salts obtained by means of mineral and vegetable essential oils soluble in caustic potash or soda. By my invention I obtain new hemostatic agents superior to any hitherto known by using alkaline salts, produced either by phenic acid (no matter the nature of the substances from which this acid is derived) or by acid oils saponifiable and soluble in caustic soda or potash derived from vegetable and mineral essential oils, especially coal, peat, wood, and ligneous oils, acid oils, which, when not actually phenic acid, are analogous or homologous—such as creosote—and possess, like phenic acid, the same hemostatic properties. The following is one of the best processes for obtaining these various alkaline salts:

*Method of preparing alkaline phenates.*—Take raw coal-oil (peat or wood oils are equally good) and stir into it, either cold or under a low heat, about the sixth of its weight of caustic soda of 36°, then pour into a vessel in which there is a tap at bottom, and allow the mixture to settle at least two hours, and if time permit twelve hours. Two different layers will be formed, the one thick, the other black and viscous, which latter remains at the lower part of the vessel, and is the phenate of soda. I style conventionally "phenates" the combination of any of the acid oils with alkalis, because among these acid oils phenic acid is almost always found. Open the tap and draw off the phenate, which will run slowly until the second layer is reached. This layer is composed of the neutral oils, which are recognized by their fluidity and limpidity. If the soda is well saturated by the acid oils, the phenate should not mark more than 16° to 17° Baumé. If it should mark 22° or 25°, there would be an excess of base, and it would be necessary to mix it up with fresh raw coal-oil in order to insure the obtaining of a neutral salt. Add water to the phenate until it only marks 8° Baumé. Two layers will again be formed. The lower layer is again the new phenate of soda, and the upper layer a thick oil, which will become reconstituted under the influence of the water. Draw off the new phenate to use, as required, adding water to bring it down to the desired degree. For fresh cuts and wounds apply it at a strength of 5°; for old wounds which have ceased bleeding, at 2° only. The oil reconstituted by the addition of the water is a composition of acid oils, neutral oils, and naphthaline oils, and may be used to produce new alkaline phenates by treating four parts of it with one part of caustic soda, stirring, drawing off, and so on, as for the first phenate. After the addition of water, naphthaline only, which was in solution among the acid oils, would rise.

Should it be desirable to use only phenic acid or acid oils previously extracted, one part of phenic acid or of acid oils should be mixed with at least two-thirds their weight of caustic soda or potash marking 36°. The mixture should be slightly heated, well stirred, and water added to bring down the alkaline salt to 8°. Heat up to boiling-point for about two minutes, withdraw the heat, and allow the mixture to settle. Decant the supernatant oils, and dilute down to 5°. To insure the alkaline salts diluted to 5° being perfectly neutral and without excess of base, it is better again to stir them again cold, and add either fresh phenic acid or fresh acid oil, allow to settle, and filter.

The phenates or alkaline salts obtained and prepared as before described are applied to stop hemorrhage as follows: If the hemorrhage is the result of a cutting-instrument, take a compress folded in four folds and dip it in an alkaline solution of phenate of soda at 5°, and place it on the wound. Its application causes neither pain nor irritation. Press the compress, and apply on the outside, through a camel's-hair brush or otherwise, more of the alkaline solution. Should the blood flow through it, apply a similar compress and act as with the first, and so on, and rarely, if ever, will it be found that the hemorrhage is not entirely arrested after the fourth compress. This is the effect produced: The blood which escapes will coagulate on contact with the alkaline phenate contained in the first compress, and will form a black precipitate. If the quantity of phenate of soda contained in the four folds of the first compress is not sufficient to coagulate all the albumen in the blood which flows, that result will be obtained by the second, third, or fourth compress. The albumen will form a solid body, which will stop the hemorrhage, either by its coagulation or by contraction of the tissues in contact with the alkaline solution. If the hemorrhage results from a bayonet-wound or from a ball, inject the same alkaline solution two or three times in succession, then fill the wound with lint soaked wet with the solution. Three or four hours after the bleeding has stopped care must be taken to remove carefully all the compresses placed upon or over the first, as the blood with which they become impregnated becomes exceedingly hard. Even should they adhere strongly, remove them only after some days. When so strongly adherent to the skin they take the place of collodion. The superiority of these alkaline salts as hemostatic agents arises from the fact that, in addition to the property they possess of coagulating the albumen of the blood like the perchloride of iron, they also have the effect of insensibilizing the edges of the wound and cause the injured tissues to contract and to harden by acting upon them in a similar manner to tannic acid.

The phenates and alkaline salts, as well as being applied in a liquid state, may be used dry, as hereinafter explained.

To obtain the phenates in a dry and divided state—

First. Dip compresses, lint, or any other fabric once or oftener in concentrated phenates and dry after each immersion. Then, when required for use, damp the material with a little water. Various fabrics, cloths, paper, and the like may be prepared beforehand by adding adhesive substances—such as gum or paste—to concentrated alkaline, phenates and paying them over or covering them with as many coats as may be desired.

Second. Impregnate with the alkaline phenates inert substances—such as carbons, insoluble earthy salts, and oxides—and dry them and damp them, or not, for use. I say damp them or not, because for many purposes they may be used with great advantage in a dry and pulverized state, and will act differently in that to the liquid state. Dry, they may be used as antiseptics. Again, to produce more energetic phenates in a dry and pulverized state, I use insoluble phenates—such as those of lime and baryta phenates—which are obtained by double decomposition by pouring a soluble salt of one of the substances above indicated in a solution of phenate of soda or of potash.

Having now described the nature of my said invention and in what manner the same is to be performed, I declare that I claim—

The manufacture and application, as hemostatic and antiseptic agents, of alkaline phenates and salts obtained by means of mineral and vegetable essential oils soluble in caustic soda or potash, in manner and for the purposes hereinbefore described.

In testimony whereof I have signed my name to this specification before two subscribing witnesses.

P. A. F. BOBŒUF.

Witnesses:
E. SHERMAN GOULD,
F. JANNIE.